Figure 1:
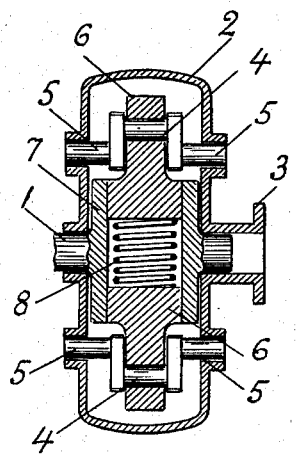

May 3, 1938.   P. DRAMINSKY   2,116,192
ELASTIC COUPLING
Filed March 18, 1937

INVENTOR
PER DRAMINSKY
by Walter S. Bleistein
ATTORNEY

Patented May 3, 1938

2,116,192

UNITED STATES PATENT OFFICE 2,116,192

ELASTIC COUPLING

Per Draminsky, Copenhagen, Denmark

Application March 18, 1937, Serial No. 131,636
In Denmark March 26, 1936

8 Claims. (Cl. 64—24)

My invention relates to an elastic coupling of the kind used as a connecting or transmitting means in such cases where an evenly rotating machine or part thereof, as e. g. the rotor of a ventilator, has to be driven directly from an unevenly rotating engine, as e. g. a Diesel engine, or where vice versa an evenly rotating engine has to drive an unevenly running machine, e. g. a plunger pump.

Such an elastic coupling must be so constructed as to prevent efficiently the extra tensions which would occur in the gearing owing to the uneven running of one of the parts, if the coupling were not present, and to this end it is necessary that the natural frequency of the system consisting of the two parts and their coupling is considerably lower than the period of the irregularity. If the said frequency is equal with or higher than the said period, the coupling may cause an increase of the raising extra tensions. A low natural frequency of the said system means that the coupling must be very elastic, i. e. the two parts of the coupling must be very elastic, i. e. that the two parts of the coupling must be able to rotate a considerable angle relatively to each other, this angular rotation taking place when the maximum torsional momentum is transmitted. In most cases occurring in practice, where the unevenly rotating engine is a piston engine, an angular rotation of about 20° or more is required. Besides, it is required that the friction against the relative rotation of the coupling is very small, as otherwise energy will be lost.

In the known constructions of elastic couplings with great relative angular rotation between the two parts a direct connection between the said parts is established by means of pressure springs bearing against projections, arms or the like in the two parts in such a way that the springs are compressed by relative motions of the two coupling parts, both in one and in the other direction, and to prevent the springs from being overloaded the angular rotation is limited, stops, projections or the like being arranged to meet each other, when the parts have rotated relatively through an angle corresponding to the allowable maximum load of the springs.

Couplings of this known kind have the deficiency that they work with a small load and are playing about their central position, disagreeable knocks are heard owing thereto that the springs meet the various stops, arms or the like, and besides it is often difficult to make the springs sufficiently elastic, because they will then be unpractically large. Therefore, there is always a risk that by very low numbers of revolution resonance will occur and lead to so vigorous oscillations that the stops or projections strike each other in such a way that the whole gearing is exposed to considerable and injurious influences. To meet this deficiency it has been proposed to arrange a maximum coupling after the spring coupling, e. g. a friction clutch coupling, but it is, however, very difficult to make such a coupling fully reliable and correctly working, and thus the said deficiency cannot be said to be done away with in a satisfactory manner.

It has also been proposed to make the coupling comprise a crank mechanism in such a way that one of the two shafts has been connected with the crank shaft of the said mechanism, while the other has been connected with the crank proper by means of a tensional spring so arranged that a complete rotation of one shaft in relation to the other can take place, if torsional moments occur, which exceed a certain limit. It is, however, difficult to construct couplings of this kind having to transmit considerable torsional moments.

The present invention relates to a coupling based partially on the above principle, but presenting, however, essential advantages above the known constructions.

According to the invention compression springs are used, which are placed in the driving part of the coupling and act outwardly, i. e. away from the axis of rotation, upon radially movable pressure pieces, plungers or similar bodies, which in their turn press on cranks situated in the driven part of the coupling or, by means of rollers, on leading curves or cam paths in the driven part in such a way that a relative rotation between the two coupling parts in one direction or the other out from their normal position will force the pressure pieces or the like simultaneously inwardly against the axis of rotation, while they are, as stated, pressed outwardly by the springs and besides by the centrifugal force, which may be considerable as compared with the spring force.

When the coupling is constructed with leading curves or cam paths, these curves or paths may be so shaped that the two coupling parts are allowed to rotate quite a revolution relatively to each other, when the torsional momentum becomes so great that the springs are fully compressed, but it is a supposition that the springs are so vigorous that this can take place only in the case of quite an abnormal overload, because when such a coupling has begun to slide all round, it will not be able to transmit any momentum worth mentioning.

The advantages of the coupling according to the invention are partly that the knocks above-mentioned as well as the more serious hits against the stops totally may be avoided, partly that the dimensions may be smaller, especially in the very common case that the resistance of the driven engine increases with the number of revolutions, as the springs in such case only need to be so vigorous that they may transmit the forces corresponding to the torque (turning moment) by low numbers of revolutions, while the centrifugal force by higher numbers of revolution gives the necessary further supply of force, and finally that it is possible by suitable dimensioning of the cranks or by suitable forming of the leading curves to obtain a very low natural frequency of the coupling, which, as before stated, is of great advantage, especially by engines by which it is desirable that they may run with numbers of revolutions essentially lower than the normal number of revolutions.

The pressure pieces may be shaped as plungers moving air-tight in their guidings, so that the enclosed air compressed by the plungers may fully or partially replace the spring pressure.

The plungers may, however, also be provided with small apertures through which the compressed air may escape, thus enabling an efficient damping of possibly occurring vibrations to take place.

The invention is illustrated in the accompanying drawing, where

Figure 2:
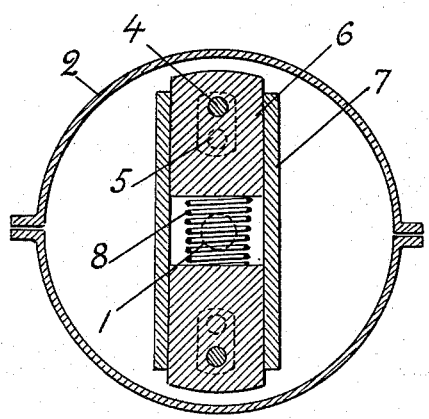
Figure 3:
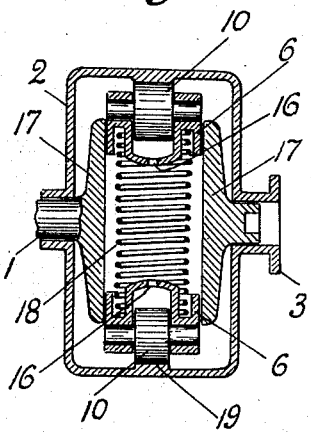
Figure 4:
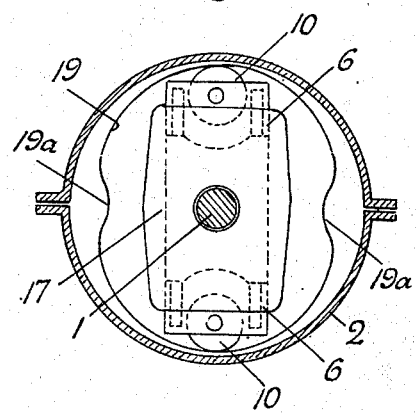

Fig. 1 is an axial section of a diagrammatically shown constructional form of a coupling according to the invention, Fig. 2 is a cross section thereof, and Figs. 3 and 4 represent another constructional form in similar views.

In Figs. 1 and 2, 1 is one of the shafts between which motion has to be transmitted, e. g. the driving shaft. To the other shaft (not shown) a casing 2 for the coupling is secured, e. g. by means of a flange 3. On the shaft 1 are shaped or secured guides 7, on which slide pressure pieces or plungers 6 connected by crank mechanisms with the casing 2, crank shafts 5 being mounted therein, while the crank pins 4 themselves are mounted in the pressure pieces 6. Between the latter a spring 8 is inserted, which tends to move the two pressure pieces away from each other, i. e. outwardly from the axis of rotation.

The coupling acts in the following manner. When it has to transmit motion, the casing 2 tends to rotate relatively to the shaft 1, but hereby the cranks 4 will force the pressure pieces 6 inwardly, in which they are counter-acted by the centrifugal force acting on the pressure pieces in combination with the force of the spring 8. Therefore, the pressure pieces 6 will assume always a position depending on the magnitude of the torsional momentum to be transmitted and the speed of rotation, as the latter determines the magnitude of the centrifugal force. The arrangement of the pressure pieces in this manner, so that the centrifugal force counter-acts the influence of the torsional momentum, enables the spring 8 to be relatively feeble, i. e. of small dimensions.

In this constructional form the two portions of the coupling, i. e. the shaft 1 and casing 2, can rotate only a certain angle in relation to each other, namely until the cranks 1 have rotated about 90°, but the relative rotation is not stopped suddenly, as is the case by the employment of stops, but gradually.

In the constructional form according to Figs. 3 and 4 a sort of cam device is employed. The shaft 1 is provided with a guide 17 for pressure pieces or plungers 6, between which is placed a compression spring 18 tending to press the plungers 6 away from each other, i. e. radially outwards. The plungers 6 carry rollers 10 coacting with a cam 19 formed in the inside of the casing 2 of the coupling connected with the other shaft (not shown). The guide 17 is so shaped that it can freely pass the summit 19a of the interior cam 19, if the allowed maximum torsional momentum should be exceeded.

This constructional form acts in a similar manner as that shown in Figs. 1 and 2. The casing 2 tends to rotate in relation to the shaft 1, which causes the cam 19, which has an even ascent, to try to force the plungers 6 inwards, in which they are, however, counter-acted by the centrifugal force acting on the plungers and the rollers 10 in combination with the force of the spring 18. Owing to the action of the centrifugal force the spring 18 may be comparatively feeble. Normally the casing 2 rotates within an angle of e. g. 30–60° in relation to the shaft 1 out from the central position represented in Fig. 4. but if the torsional momentum reaches extraordinarily high degrees, a relative rotation of more than 90° may occur, so that the rollers 10 pass the summits 19a of the cams 19 and the two parts of the coupling rotate, in fact, fully in relation to each other. As soon as the torsional momentum sinks again below the limit in question, the coupling parts assume again a relative position corresponding to the heights of the torsional momentum and the speed of revolution.

The plungers 6 may move air-tight in their guides 7 or 17 so as to compress the air between them, when they move towards each other, thus allowing the spring force to be further reduced, or may-be, the compressed air may replace the spring force. They may, however, also be made with a suitable small play or be provided with small holes, as indicated by 16 in Fig. 3, so that the compressed air can escape in the course of a suitable time, whereby an efficient damping of contingently raising oscillations may be obtained.

The invention is not bound to the constructional forms above described and illustrated in the drawing, the said constructional forms serving only by way of examples.

I claim:—

1. An elastic coupling comprising a driving and a driven coupling member, radially movable pressure bodies in one of said coupling members, guiding means in combination with said other coupling member to urge said pressure members equally and progressively inward when one of said coupling members turns out of its normal position (position of rest) relatively to the other one, anti-friction means in connection with said pressure members to engage said guiding means with little friction, and resilient means in engagement with said pressure members to press the same outward, said guiding means being so arranged and constructed that a maximum compression of said resilient means, occurring under an abnormal load, corresponds to a great angle of relative rotation of said coupling members.

2. An elastic coupling as claimed in claim 1, in which said pressure bodies are constituted by plungers, guides being provided in one coupling member for said plungers, said plungers fitting air-tight in said guides, so that the pressure of the air compressed by said plungers may add to the pressure of said resilient means.

3. An elastic coupling as claimed in claim 1, in which said pressure bodies are constituted by plungers, radially arranged cylinders being provided in the one coupling member, said plungers being movable in said cylinders, and means for the escape of the air compressed by the plungers in the course of a suitable time to cause a damping of oscillations which may occur.

4. An elastic coupling comprising a driving and a driven coupling member, radially movable pressure bodies in one of said coupling members, a cam surface within said other coupling member, and resilient means bearing against said pressure bodies, said pressure bodies being adapted to move along said cam surface with little friction, said resilient means being so arranged as to urge said pressure bodies outward into engagement with said cam surface and said cam surface being so shaped as to define a path for said pressure bodies for a complete revolution of one of said coupling members relatively to the other one, and having sloping portions to force said pressure bodies, simultaneously and equally, towards the axis of rotation when said coupling members turn relatively to each other out of their normal position (position of rest).

5. An elastic coupling comprising a driving and a driven coupling member, radially movable pressure bodies in one of said coupling members, a cam surface within said other coupling member, and resilient means bearing against said pressure bodies so as to urge them outward into engagement with said cam surface, said cam surface having inwardly projecting sloping portions, the maximum projections of said sloping portions being smaller than the maximum possible inward stroke of said pressure bodies, whereby said pressure bodies may pass said maximum projections under an excessive overload to permit the coupling members to complete a revolution relatively to each other, and said resilient means being so dimensioned as to prevent said pressure bodies from passing said maximum projections under normal working conditions.

6. An elastic coupling comprising a driving and a driven coupling member, radially movable pressure bodies in one of said coupling members, anti-friction rollers at the outer ends of said pressure bodies, resilient means bearing against the inner ends of said pressure bodies, a cam surface at the inner circumference of said other coupling member and adapted for engagement with said anti-friction rollers, said cam surface being so shaped as to define a path for said anti-friction rollers for a complete revolution of said coupling members relatively to each other, and having sloping portions to force said pressure bodies simultaneously and equally, towards the axis of rotation when said coupling members turn relatively to each other out of their normal position (position of rest).

7. A device as claimed in claim 4, in which said pressure bodies are arrangd in pairs, the individual bodies of each pair being opposite each other on the same diameter, said resilient means consisting of one compression spring for a pair of said pressure bodies, said spring bearing with its ends against the inner ends respectively of said pressure bodies.

8. A device as claimed in claim 2, in which said cam surface has symmetrical portions with respect to the points of contact of said pressure bodies in the normal position (position of rest) of said coupling members relatively to each other so that the driven coupling member will be equally influenced in either direction of rotation of the driving member.

PER DRAMINSKY.